(12) United States Patent
Camp et al.

(10) Patent No.: US 12,704,731 B2
(45) Date of Patent: Aug. 11, 2026

(54) WEARABLE ELECTRONIC DEVICE INCLUDING COUNTERBALANCE

(71) Applicant: Apple Inc., Cupertino, CA (US)

(72) Inventors: John S. Camp, Los Gatos, CA (US); Adam Y. Kollgaard, San Jose, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 18/822,020

(22) Filed: Aug. 30, 2024

(65) Prior Publication Data

US 2025/0102815 A1 Mar. 27, 2025

Related U.S. Application Data

(60) Provisional application No. 63/585,864, filed on Sep. 27, 2023.

(51) Int. Cl.
*G02B 27/01* (2006.01)

(52) U.S. Cl.
CPC .. *G02B 27/0176* (2013.01); *G02B 2027/0192* (2013.01)

(58) Field of Classification Search
CPC .................... G02B 27/0176; G02B 2027/0192
See application file for complete search history.

(56) References Cited

U.S. PATENT DOCUMENTS 9,778,467 B1 * 10/2017 White ................ G02B 27/0176
10,108,016 B2 * 10/2018 Bosveld ................. A41D 20/00
11,036,054 B2 * 6/2021 Poore ................... G02B 27/017
11,181,748 B1 * 11/2021 Williamson ....... G02B 27/0093
11,300,999 B1 * 4/2022 Kadirvel ............... G06F 1/1635
2015/0282760 A1 * 10/2015 Badower .............. A61B 5/6803
600/383
2019/0030394 A1 * 1/2019 Orr ........................ G16H 20/30
2022/0412507 A1 * 12/2022 Roig ...................... F16M 13/04
2023/0152594 A1 * 5/2023 Davidson ................ G06F 1/203
359/601
2025/0020931 A1 * 1/2025 Gera ...................... G02B 6/003

* cited by examiner

*Primary Examiner* — Kwang-Su Yang
(74) *Attorney, Agent, or Firm* — Dorsey & Whitney LLP

(57) ABSTRACT

Wearable electronic devices including counterbalances for adjusting balance points thereof and methods of using the same are disclosed. In an example, head-mountable electronic device includes a display unit, a securement band connected to the display unit, an overhead band including a first end secured to the securement band and a second end secured to the securement band, and a counterbalance connected to the securement band between the first end and the second end. A distance between the counterbalance and the first end can be adjustable.

20 Claims, 6 Drawing Sheets

D1
D2
314
318a
316
300a
306a
302
312
308
304
320a
301

D3
D4
314
318b
316
300b
306b
302
312
308
304
320b
301

D5
D6
414
418
416
401
400
406
410
402
412
408
404
422
420

WEARABLE ELECTRONIC DEVICE INCLUDING COUNTERBALANCE

CROSS-REFERENCE TO RELATED APPLICATION

This application claims the benefit of U.S. Provisional Patent Application No. 63/585,864, filed 27 Sep. 2023, and entitled "ELECTRONIC DEVICE INCLUDING COUNTERBALANCE," the entire disclosure of which is hereby incorporated by reference.

FIELD

The described embodiments relate generally to electronic devices. More particularly, the present embodiments relate to head-mountable electronic devices.

BACKGROUND

Recent advances in portable computing have enabled head-mountable devices that provide augmented and virtual reality experiences to users. Various components of these devices, such as display screens, viewing frames, securement arms, speakers, batteries, and other components, operate together to provide an immersive and comfortable experience. Components of these devices used to provide visual displays to users are relatively heavy and positioned towards the front of user's heads. This results in the devices being generally front-heavy and unbalanced. It is desirable to provide head-mountable devices that are balanced and comfortable to wear.

SUMMARY

In at least one example of the present disclosure, a head-mountable electronic device, includes a display unit, a securement band connected to the display unit, an overhead band including a first end secured to the securement band and a second end secured to the securement band, and a counterbalance connected to the securement band between the first end and the second end. A distance between the counterbalance and the first end can be adjustable.

In some examples, the counterbalance is a first counterbalance. The head-mountable electronic device can further include a second counterbalance connected to the securement band between the first end and the second end. In some examples, the distance is a first distance. A second distance between the second counterbalance and the second end can be adjustable.

In some examples, the counterbalance can include an electronic component of the head-mountable electronic device. In some examples, the electronic component can include a battery electrically coupled to the display unit.

In some examples, the securement band can include a first portion including opposing ends coupled to the display unit, and a second portion overlapping the first portion between the first end and the second end. The second portion can be adjustable relative to the first portion. The counterbalance can be connected to one of the first portion between the first end and the second end, or the second portion. In some examples, a length of the other of the first portion or the second portion can be adjustable.

In some examples, the counterbalance can be slidably connected to the securement band. In some examples, the head-mountable electronic device can further include a piston. The counterbalance can be adjustably connected to the securement band via the piston.

In at least one example of the present disclosure, a wearable electronic device includes a display unit, and a securement assembly. The securement assembly can include a first band having a first end secured to the display unit and a second end secured to the display unit, a second band connected to the first band at a first pivot between the first end and the second end and at a second pivot between the first end and the second end, a first counterbalance adjustably secured to the first band between the first pivot and the second pivot, and a second counterbalance adjustably secured to the first band between the first pivot and the second pivot.

In some examples, the display unit can include a display screen, and the first counterbalance can include a battery electrically coupled to the display screen.

In some examples, the wearable electronic device can further include an actuator. The actuator can be configured to automatically adjust a first distance between the first counterbalance and the first pivot, and a second distance between the second counterbalance and the second pivot. In some examples, the wearable electronic device can further include a controller electrically coupled to the actuator and configured to cause the actuator to adjust the first distance and the second distance based on a change in a length of the first band. In some examples, the first counterbalance and the second counterbalance are manually adjustable.

In at least one example of the present disclosure, a head-mountable display device includes a display unit, a counterbalance, a securement band extending between the display unit and the counterbalance, and an overhead band coupled to the securement band to define a pivot between the display unit and the counterbalance. A first moment arm can be defined between the pivot and the display unit. A second moment arm can be defined between the pivot and the counterbalance. The second moment arm can be adjustable.

In some examples, the counterbalance can be adjustably connected to the securement band. The counterbalance can be adjustable to equalize the first moment arm and the second moment arm. In some examples, the head-mountable display device can further include an actuator mechanically coupled to the counterbalance, and a controller electrically coupled to the actuator. The controller can be configured to cause the actuator to adjust a position of the counterbalance to equalize the first moment arm and the second moment arm. In some examples, the adjustment of the position of the counterbalance can be based on a change in a length of the securement band.

In some examples, the head-mountable display device can further include an adjustment mechanism configured to adjust a length of the securement band. In some examples, the second moment arm can be adjustable independent from an adjustment of the length of the securement band.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
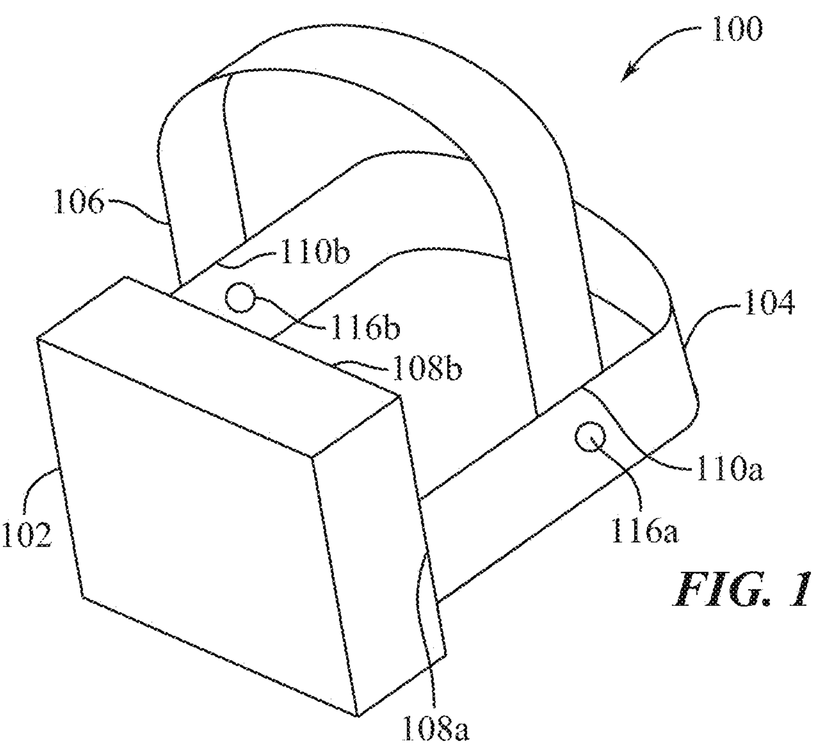
FIG. 1 shows a perspective view of a head-mountable device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to wearable electronic devices (e.g., head-mountable devices (HMDs)). More particularly, the present examples relate to counterbalances for HMDs that can be used to balance the weight of display components of the HMDs.

In at least one example, a head-mountable device can include a display unit and a securement band extending from the display unit. The head-mountable device can be secured on a user's head by the securement band such that a display screen of the display unit is positioned in front of the user's eyes. The display unit can be relatively heavy as compared to the securement band and other components of the head-mountable device disposed rearward of the display unit. This results in the head-mountable device being unbalanced, with a large portion of the weight of the display unit being supported by the user's face.

A head-mountable device of the present disclosure includes a counterbalance, which can be mounted on the securement band to balance the weight of the display unit. As will be discussed in detail below, the counterbalance can be movable, and can be adjusted to balance the head-mountable device, even when the head-mountable device is worn by users having a variety of head shapes and sizes. The counterbalance can be attached to the securement band, or can extend from the securement band. The counterbalance can be automatically or manually actuated. The amount of counterbalancing provided by the counterbalance can be adjusted based on user preferences. In some examples, an overhead band can be connected to the securement band, and an attachment position or angle of the overhead band relative to the securement band can be adjustable to adjust the balance point of the head-mountable device. Sensors can be provided in the head-mountable device, such as in the display unit, the securement band, and/or the overhead band to determine the balance of the head-mountable device and aid in adjusting the counterbalance. The counterbalance takes weight off of the user's face, balances the head-mountable device, and improves user comfort while wearing the head-mountable device.

These and other examples are discussed below with reference to FIGS. 1 through 10. However, those skilled in the art will readily appreciate that the detailed description given herein with respect to these figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 2:
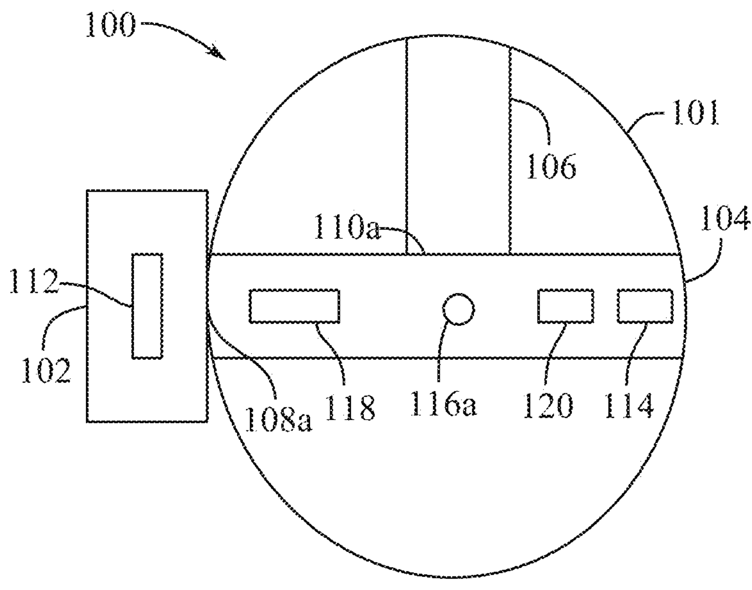
FIG. 2 shows a side view of a head-mountable device worn by a user.

FIGS. 1 and 2 illustrate a head-mountable device (HMD) 100 including a display unit 102, a securement band 104, and an overhead band 106. The overhead band 106 is optional, and can be omitted in some embodiments. A first end 108*a* and a second end 108*b* (e.g., opposing ends) of the securement band 104 can be connected to the display unit 102. The securement band 104 can extend distally from the display unit 102, or rearward from the display unit 102 relative to a user's head 101. A first end 110*a* and a second end 110*b* of the overhead band 106 can be connected to the securement band 104, forming a first pivot 116*a* and a second pivot 116*b*, respectively. The overhead band 106 can extend upward from the securement band 104 relative to the user's head 101. The securement band 104 and the overhead band 106 can be used to retain the HMD 100 on the user's head 101 such that the display unit 102 is positioned in front of the user's eyes. In some examples, the securement band 104 and the overhead band 106, including the components connected thereto, can form a securement assembly.

The display unit 102 can include one or more optical lenses or display screens that are configured to be positioned in front of the user's eyes. As illustrated in FIG. 2, the display unit 102 can include a display 112 configured to present an augmented reality visualization, a virtual reality visualization, or another suitable visualization to the user. The display 112 can be positioned at least partially in or on a frame, which can be a housing of the display unit 102.

The user's head 101 can bear the weight of the HMD 100 through normal forces between the overhead band 106 and the top of the user's head, normal forces between the display unit 102 and the user's nose, normal forces between the securement band 104 and the user's ears, and/or friction forces between the display unit 102, the securement band 104, and the overhead band 106. The overhead band 106 can be configured to such that a majority of the weight of the HMD 100 is born by the user's head 101 through a normal force between the overhead band 106 and the user's head 101. However, the display unit 102 can include relatively heavy components of the HMD 100, such as a frame, display screens (e.g., the display 112), optical lenses, electronic components, and the like, which are used to deliver visualization to the user. In contrast, the securement band 104 and the overhead band 106 can be relatively light. As a result, a balance point of the HMD 100 can be forward biased relative to the user's head 101, towards the display unit 102. This results in the HMD 100 being unbalanced, such that a majority of the weight of the HMD 100 is transferred to the user's face through the display unit 102. This can reduce comfort, especially as the HMD 100 is worn for longer periods of use.

In some examples, the weight of the HMD 100 can be balanced by providing a counterbalance 114 on the securement band 104. For example, as illustrated in FIG. 2, the counterbalance 114 can be provided on the securement band 104 opposite the display unit 102 relative to the overhead band 106. A position of the counterbalance 114 can be adjustable, which allows for the HMD 100 to be balanced, regardless of users with different head sizes and the like donning the HMD 100.

The counterbalance 114 can be adjusted through a manual actuator, or an automatic actuator. The counterbalance 114 can be adjusted through manual actuation by adjusting a dial on the securement band 104, sliding the counterbalance 114 relative to the securement band 104, rotating the counterbalance 114 relative to the securement band 104, telescoping the counterbalance 114 relative to the securement band 104, or the like. The counterbalance 114 can be slidably connected to the securement band 104, rotationally connected to the securement band 104, or the like.

The counterbalance 114 can be adjusted through automatic actuation by motors, pistons, or the like. For example, a controller of the HMD 100 can be electrically coupled to a motor, which can adjust the counterbalance 114 in response to a signal from the controller. The controller can signal the motor to adjust the position of the counterbalance 114 to equalize moment arms from the counterbalance 114 and the display unit 102. In some examples, a user's face can be scanned, a head size of the user can be estimated, and the counterbalance 114 can be automatically adjusted based on this face scan and estimated head size. In some examples, a user can adjust a length of the securement band 104 based on their head size, and the counterbalance 114 can be adjusted based on the adjustment to the length of the securement band. The adjustment to the counterbalance 114 can be automatic, either through the adjustment to the length of the securement band 104 being directly tied to the position of the counterbalance 114 (e.g., a dial that adjusts the length of the securement band 104 also adjusts the position of the counterbalance 114), or through an automatic actuation that adjusts the position of the counterbalance 114 based on the length of the securement band 104.

Actuators for adjusting the position of the counterbalance 114 can be included in the display unit 102, the securement band 104, and/or the counterbalance 114. In some examples, a mass of the counterbalance 114, rather than the position of the counterbalance 114, can be adjustable, such as by adding or removing mass (e.g., water, sand, metal, battery packs, other relatively heavy materials, or the like) from the counterbalance 114.

The counterbalance 114 can include functional and/or non-functional components of the HMD 100. In examples in which the counterbalance 114 includes functional components of the HMD 100, the counterbalance 114 can include electronic components (e.g., batteries, processors, speakers, memory components, motors, or the like), tension adjusters, dials, actuators, or the like. In examples in which the counterbalance 114 includes non-functional components of the HMD 100, the counterbalance 114 can include a housing, dead weight, an aesthetic component of the HMD 100, or the like. The mass of the counterbalance 114 can be adjustable, such as by adding or removing mass from a housing. In some examples, the counterbalance 114 can include a battery of the HMD 100, and additional battery packs can be coupled to the counterbalance 114 to add to the mass of the counterbalance 114.

The counterbalance 114 and the display unit 102 can apply moments to the overhead band 106 about the pivots 116*a*, 116*b* formed at the ends 110*a*, 110*b* of the overhead band 106 connected to the securement band 104. This can apply torque to the overhead band 106 if the moments of the counterbalance 114 and the display unit 102 are not balanced. Balancing the moments applied by the counterbalance 114 and the display unit 102 balances the HMD 100 such that no torque is applied to the overhead band 106. The moments applied by the counterbalance 114 and the display unit 102 can be balanced by adjusting the mass of the counterbalance 114, adjusting the position of the counterbalance 114, and/or adjusting the position of the pivots 116*a*, 116*b*. The HMD 100 can be balanced when the moments applied to the pivots 116*a*, 116*b* by the display unit 102 and the counterbalance 114 are equal. In some examples, the HMD 100 can be considered balanced within a range. For example, the HMD 100 can be considered to be balanced when a moment applied by the counterbalance 114 is in a range of 50% to 125%, 80% to 110%, 95% to 105%, or the like of a moment applied by the display unit 102. The balance of the HMD 100 can vary from 100% based on user preferences or the like. In some examples, users of the HMD 100 can be associated with user profiles, which store user preferences related to the balance of the HMD 100.

In some examples, the weight of the HMD 100 can be balanced by adjusting a position of the overhead band 106 relative to the securement band 104. Specifically, connection points between the first end 110*a* and the second end 110*b* of the overhead band 106 and the securement band 104 can be moved forward or rearward relative to the user's head 101 (e.g., proximally or distally relative to the display unit 102) to move the first pivot 116*a* and the second pivot 116*b*, respectively, forward or rearward. Moving the pivots 116*a*, 116*b* forward relative to the user's head 101 results in the display unit 102 having a shorter moment arm relative to the counterbalance 114, and moves the balance point of the HMD 100 rearward. Moving the pivots 116*a*, 116*b* rearward relative to the user's head 101 results in the display unit 102 having a longer moment arm relative to the counterbalance 114, and moves the balance point of the HMD 100 forward.

Further, positions of the securement band 104 and the overhead band 106 on the user's head 101 can be adjusted, which can move where on the user's head 101 the weight of the HMD 100 is born. For example, the overhead band 106 can be moved forward or rearward relative to the user's head 101 and the securement band 104 can be moved up or down relative to the user's head 101. The securement band 104 can extend from the display unit 102 at a perpendicular angle or an oblique angle relative to the display unit 102 and gravity. The overhead band 106 can extend from the securement band 104 at a parallel angle or an oblique angle relative to gravity and a perpendicular angle or an oblique angle relative to the securement band 104. The overhead band 106 can be angled perpendicular to or oblique to the securement band 104. The user can adjust the angles of the securement band 104 and the overhead band 106 as they don the HMD 100 in order to achieve a comfortable fit and balance of the HMD 100 on the user's head 101.

Balancing the weight of the HMD 100 can move weight of the HMD 100 (e.g., the display unit 102) off of the user's face. Balancing the weight of the HMD 100 can provide for a higher percentage of the weight of the HMD 100 being born by the top of the user's head 101 through the overhead band 106. Balancing the weight of the HMD 100 can provide for a lower perceived weight of the HMD 100. All of these benefits can improve user comfort while wearing the HMD 100.

The HMD 100 can further include force sensors, which can be disposed in the display unit 102, the securement band 104, and/or the overhead band 106. The force sensors can be disposed between the display unit 102, the securement band 104, and/or the overhead band 106 and the user's head 101. The force sensors can detect forces between the HMD 100 and the user's head 101. This force data can be used to determine whether the HMD 100 is balanced. If the HMD 100 is unbalanced, the counterbalance 114 can be automatically adjusted, or the user can be instructed to manually adjust the counterbalance 114 in order to correct the balance of the HMD 100. For example, the HMD 100 can control an automatic actuator to adjust the counterbalance 114, thereby adjusting the balance of the HMD 100. The HMD 100 can provide instructions to the user to manipulate a manual actuator to adjust the counterbalance 114, thereby adjusting the balance of the HMD 100.

The securement band 104 can further include one or more electronic components, such as a first electronic component 118 and a second electronic component 120. The electronic components 118, 120 can include any number of electronic components and can be configured to operate and produce a virtual or augmented reality experience to the user through the HMD 100. The electronic components 118, 120 can include a projector, a waveguide, a speaker, a processor, or a memory component. In examples where the electronic components 118, 120 include a projector and/or a waveguide, the projector and/or waveguide can be configured to project light that is displayed on the display 112.

The counterbalance 114 and the electronic components 118, 120 can be disposed within an internal volume of the HMD 100 (e.g., within an internal volume of the securement band 104) such that the components are hidden from view. Alternatively, one or more of the counterbalance 114 and the electronic components 118, 120 can be disposed on the HMD 100, such as on a housing of the securement band 104.

Figures 3A, 3B, 4:
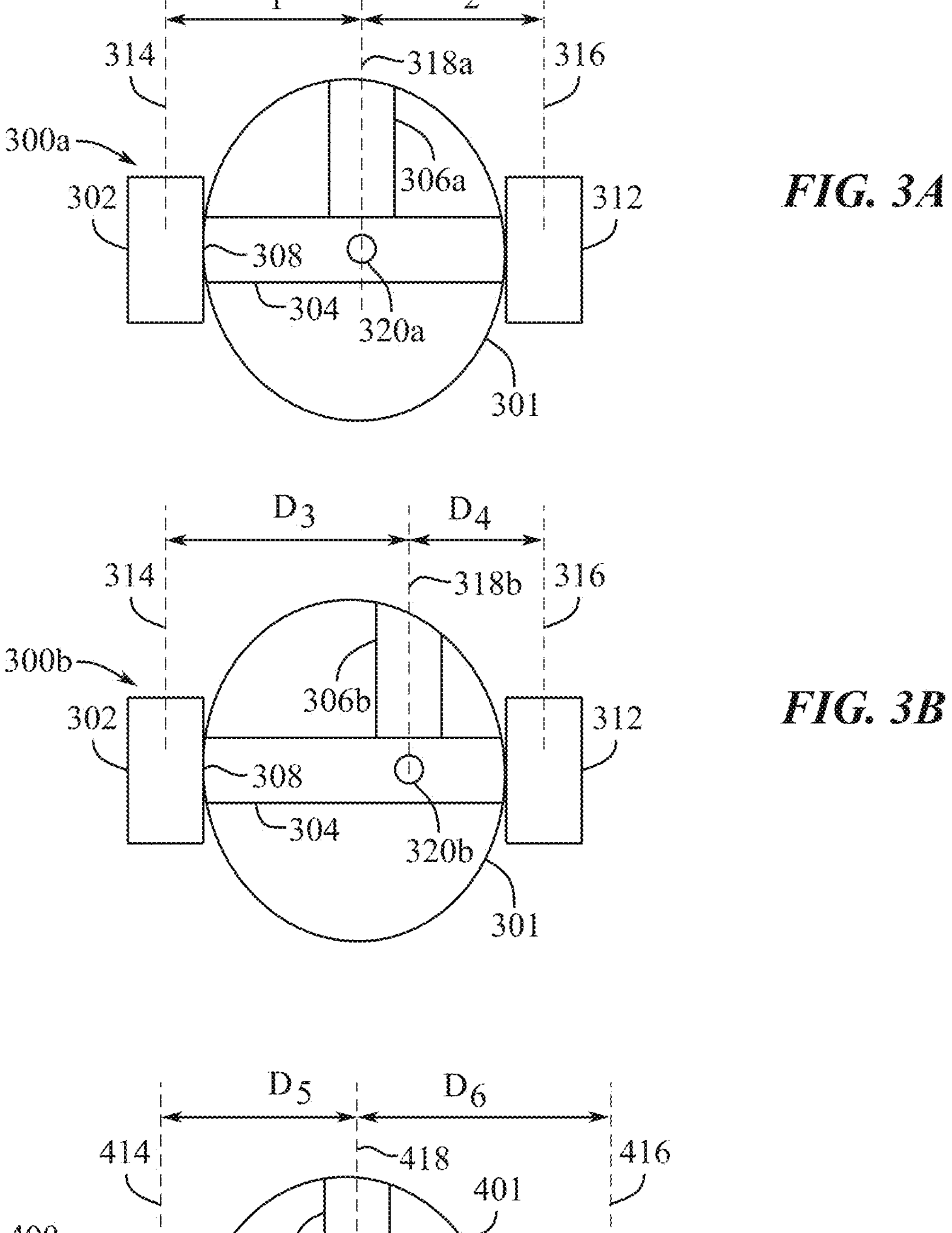
FIG. 3A shows a side view of a head-mountable device including a counterbalance worn by a user.
FIG. 3B shows a side view of a head-mountable device including a counterbalance worn by a user.
FIG. 4 shows a side view of a head-mountable device including an extendable counterbalance worn by a user.

FIGS. 3A and 3B illustrate alternative moment arms of HMDs 300*a* and 300*b* donned on a user's head 301. The HMDs 300*a* and 300*b* can be the same as or similar to, including the same or similar components to, the HMD 100, illustrated and discussed with respect to FIGS. 1 and 2. For example, the HMDs 300*a* and 300*b* can include a display unit 302, a securement band 304 extending from and connected to the display unit 302, and an overhead band 306*a*, 306*b* extending from and connected to the securement band 304. The securement band 304 can be connected to the display unit 302 at ends 308, and the overhead band 306*a*, 306*b* can be connected to the securement band 304 at ends 310*a*, 310*b* (defining pivots 320*a*, 320*b*). A counterbalance 312 can be connected to the securement band 304 opposite the display unit 302.

FIG. 3A illustrates a centered configuration of an HMD 300*a*. In the example of FIG. 3A, a first distance $D_1$ between a center of mass 314 of the display unit 302 and a center of mass 318*a* of the overhead band 306*a* (defined at a pivot 320*a*) is equal to a second distance $D_2$ between the center of mass 318*a* of the overhead band 306*a* and a center of mass 316 of the counterbalance 312. In this example, the HMD 300*a* can be balanced by using a counterbalance 312 having the same mass as the display unit 302.

FIG. 3B illustrates an off-centered configuration of an HMD 300*b*. In the example of FIG. 3B, a first distance $D_3$ between a center of mass 314 of the display unit 302 and a center of mass 318*b* of the overhead band 306*b* (defined at a pivot 320*b*) is greater than a second distance $D_4$ between the center of mass 318*b* of the overhead band 306*b* and a center of mass 316 of the counterbalance 312. In this example, the HMD 300*b* can be balanced by using a counterbalance 312 having a greater mass than the display unit 302.

Based on the examples of FIGS. 3A and 3B, positions of the overhead bands 306*a*, 306*b* and masses of the counterbalances 312 can be selected to achieve balanced HMDs 300*a*, 300*b*. Moving the positions of the overhead bands 306*a*, 306*b* forward relative to the user's head 301 can be used to allow relatively lighter counterbalances 312 to balance the display unit 302. This can reduce the weight of the HMDs 300*a*, 300*b*, and can reduce the bulkiness of the counterbalances 312. The overhead bands 306*a*, 306*b* can be positioned in desired positions based on user comfort, and positions and masses of the counterbalances 312 can be selected accordingly.

FIG. 4 illustrates an HMD 400 including an extendable counterbalance 412 donned on a user's head 401. The HMD 400 can be the same as or similar to, including the same or similar components to, the HMDs 100, 300*a*, 300*b*, illustrated and discussed with respect to FIGS. 1 through 3B. For example, the HMD 400 can include a display unit 402, a securement band 404 extending from and connected to the display unit 402, and an overhead band 406 extending from and connected to the securement band 404. The securement band 404 can be connected to the display unit 402 at ends 408, and the overhead band 406 can be connected to the securement band 404 at ends 410 (defining pivots 422). The counterbalance 412 can be connected to the securement band 404 opposite the display unit 402 through an adjustment mechanism 420 (also referred to as an expansion or extension mechanism).

In FIG. 4, the overhead band 406 can be positioned centrally relative to the user's head 401 in a fore-aft direction. However, the overhead band 406 can be positioned forward or rearward of the illustrated position of FIG. 4, and the securement band 404 and/or the overhead band 406 can be angled relative to the configuration illustrated in FIG. 4. A moment arm between the display unit 402 and the pivot 422 can be defined by the mass of the display unit 402 and a distance $D_5$ between a center of mass 414 of the display unit 402 and a center of mass 418 of the overhead band 406 (defined at the pivot 422). A moment arm between the counterbalance 412 and the pivot 422 can be defined by the mass of the counterbalance 412 and a distance $D_6$ between a center of mass 416 of the counterbalance 412 and the center of mass 418 of the overhead band 406 (defined at the pivot 422).

The adjustment mechanism 420 can be used to adjust the distance Do, thereby adjusting the moment arm provided by the counterbalance 412 and the balance of the HMD 400. The adjustment mechanism 420 can be extended to move the counterbalance 412 rearward relative to the user's head 401 and distally relative to the display unit 402, increasing the moment arm supplied by the counterbalance 412, and moving the balance point of the HMD 400 rearward relative to the user's head 401 and distally relative to the display unit 402. The adjustment mechanism 420 can be retracted to move the counterbalance 412 forward relative to the user's head 401 and proximally relative to the display unit 402, decreasing the moment arm supplied by the counterbalance 412, and moving the balance point of the HMD 400 forward relative to the user's head 401 and proximally relative to the display unit 402. In some examples, the distance $D_6$ can and the moment arm supplied by the counterbalance 412 can be adjusted by rotating the adjustment mechanism 420 and the counterbalance 412 relative to the securement band 404. For example, rotating the adjustment mechanism 420 and the counterbalance 412 such that a longitudinal axis of the adjustment mechanism 420 is closer to parallel to a longitudinal axis of the securement band 404 can increase the distance $D_6$, while rotating the adjustment mechanism 420 and the counterbalance 412 such that the longitudinal axis of the adjustment mechanism 420 is further from parallel to the longitudinal axis of the securement band 404 can decrease the distance $D_6$.

The adjustment mechanism 420 can include bands that slide relative to each other, dials, telescoping tubes, hinges, or the like. The adjustment mechanism 420 can be automatically actuated, such as through a motor, a piston, combinations thereof or the like. The actuation of the adjustment mechanism 420 can be controlled by the HMD 400. In some examples, a user's face can be scanned, a head size of the user can be estimated, and the adjustment mechanism 420 can be automatically adjusted based on this face scan and estimated head size. The adjustment mechanism 420 can be manually actuated, such as through manipulation by a user of the HMD 400. The HMD 400 can prompt the user to manipulate the adjustment mechanism 420 in order to accurately adjust the balance of the HMD 400, or the user can adjust the adjustment mechanism 420 based on feel. The adjustment mechanism 420 can be part of or coupled to the securement band 404 and/or the counterbalance 412.

Figure 5:
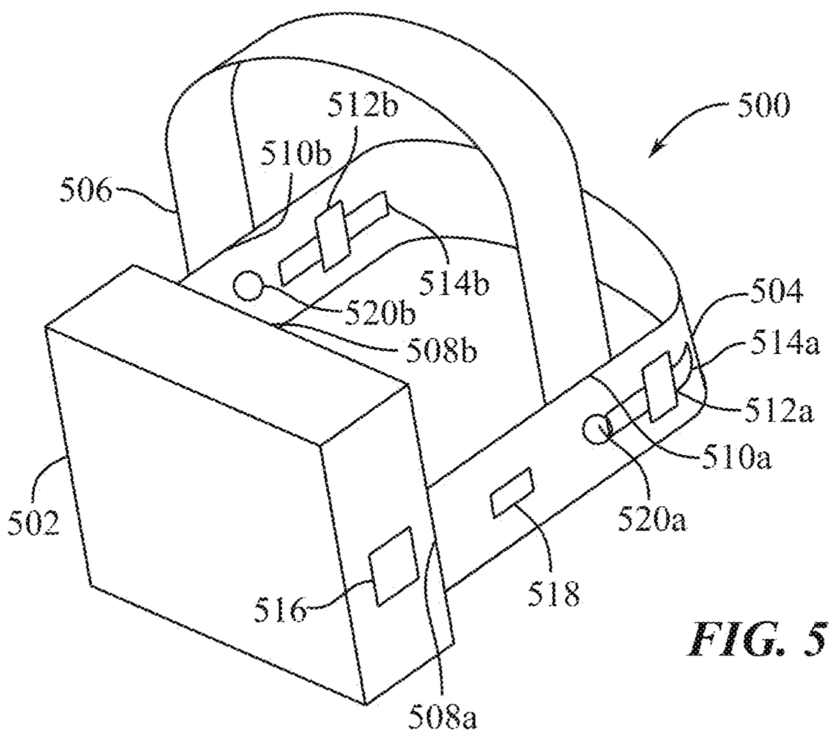
FIG. 5 shows a perspective view of a head-mountable device including a slidable counterbalance.

FIG. 5 illustrates an HMD 500 including sliding counterbalances 512*a*, 512*b*. The HMD 500 can be the same as or similar to, including the same or similar components to, the HMDs 100, 300*a*, 300*b*, illustrated and discussed with respect to FIGS. 1 through 3B. For example, the HMD 500 can include a display unit 502, a securement band 504 extending from and connected to the display unit 502, and an overhead band 506 extending from and connected to the securement band 504. The securement band 504 can be connected to the display unit 502 at ends 508*a*, 508*b*, and the overhead band 506 can be connected to the securement band 504 at ends 510*a*, 510*b* (defining pivots 520*a*, 520*b*). The display unit 502 can include a display 516 configured to present an augmented reality visualization, a virtual reality visualization, or another suitable visualization to the user. The securement band 504 can include an electronic component 518 that can be configured to operate and produce a virtual or augmented reality experience to the user through the HMD 500. The electronic component 518 can include a projector, a waveguide, a speaker, a processor, or a memory component.

Each of the counterbalances 512*a*, 512*b* can be connected to the securement band 504 in a respective track 514*a*, 514*b*. The counterbalances 512*a*, 512*b* can move proximally or distally relative to the display unit 502 or forward or rearward relative to a user wearing the HMD 500 along the tracks 514*a*, 514*b* to balance the HMD 500. Moving the counterbalances 512*a*, 512*b* proximally or distally relative to the pivots 520*a*, 520*b* decreases or increases, respectively, the moment arm applied by the counterbalances 512*a*, 512*b*, which can be used to balance the weight of the HMD 500 between the display unit 502 and the counterbalances 512*a*, 512*b*.

In some examples, the counterbalances 512*a*, 512*b* can move automatically, through a motor or other electronic actuator controlled by the HMD 500. In some examples, a user's face can be scanned, a head size of the user can be estimated, and the counterbalances 512*a*, 512*b* can be automatically adjusted based on this face scan and estimated head size. In some examples, the counterbalances 512*a*, 512*b* can be manually actuated or adjusted. For example, a user of the HMD 500 can directly manipulate the counterbalances 512*a*, 512*b*, or can manipulate a dial or another adjustment mechanism to adjust positions of the counterbalances 512*a*, 512*b*. Balancing the weight of the HMD 500 can move weight of the HMD 500 (e.g., the display unit 502) off of the user's face, shift weight bearing of the HMD 500 to the top of the user's head through the overhead band 506, provide a lower perceived weight of the HMD 500, and improve user comfort while wearing the HMD 500.

Figure 6:
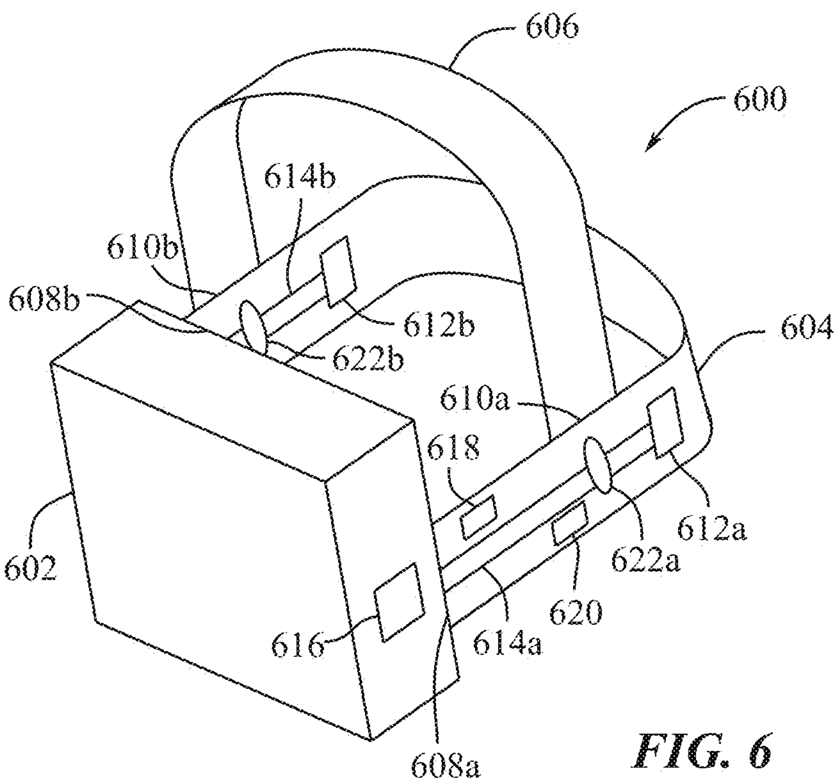
FIG. 6 shows a perspective view of a head-mountable device including a piston counterbalance.

FIG. 6 illustrates an HMD 600 including piston-actuated counterbalances 612*a*, 612*b*. The HMD 600 can be the same as or similar to, including the same or similar components to, the HMDs 100, 300*a*, 300*b*, illustrated and discussed with respect to FIGS. 1 through 3B. For example, the HMD 600 can include a display unit 602, a securement band 604 extending from and connected to the display unit 602, and an overhead band 606 extending from and connected to the securement band 604. The securement band 604 can be connected to the display unit 602 at ends 608*a*, 608*b*, and the overhead band 606 can be connected to the securement band 604 at ends 610*a*, 610*b* (defining pivots 622*a*, 622*b*). The display unit 602 can include a display 616 configured to present an augmented reality visualization, a virtual reality visualization, or another suitable visualization to the user. The securement band 604 can include electronic components 618, 620 that can be configured to operate and produce a virtual or augmented reality experience to the user through the HMD 600. The electronic components 618, 620 can include projectors, waveguides, speakers, processors, or memory components.

Each of the counterbalances 612*a*, 612*b* can be connected to the securement band 604 with a respective piston 614*a*, 614*b*. In other words, the pistons 614*a*, 614*b* can be connected to the securement band 604, and the counterbalances 612*a*, 612*b* can be connected to the respective pistons 614*a*, 614*b*. The pistons 614*a*, 614*b* can move the counterbalances 612*a*, 612*b* proximally or distally relative to the display unit 602 or forward or rearward relative to a user wearing the HMD 600 to balance the HMD 600. Moving the counterbalances 612*a*, 612*b* proximally or distally relative to the pivots 622, 622*b* decreases or increases, respectively, the moment arm applied by the counterbalances 612*a*, 612*b*, which can be used to balance the weight of the HMD 600 between the display unit 602 and the counterbalances 612*a*, 612*b*.

In some examples, the pistons 614*a*, 614*b* can move the counterbalances 612*a*, 612*b* automatically, through a motor or other electronic actuator controlled by the HMD 600. In some examples, a user's face can be scanned, a head size of the user can be estimated, and the pistons 614*a*, 614*b* can automatically adjust the positions of the counterbalances 612*a*, 612*b* based on this face scan and an estimated head size. In some examples, the pistons 614*a*, 614*b* can be manually actuated to adjust the positions of the counterbalances 612*a*, 612*b*. For example, a user of the HMD 600 can directly manipulate the counterbalances 612*a*, 612*b* (with the pistons 614*a*, 614*b* retaining the counterbalances 612*a*, 612*b* in a desired position), or can manipulate a dial or another adjustment mechanism to adjust positions of the counterbalances 612*a*, 612*b* through the pistons 614*a*, 614*b*. Balancing the weight of the HMD 600 can move weight of the HMD 600 (e.g., the display unit 602) off of the user's face, shift weight bearing of the HMD 600 to the top of the user's head through the overhead band 606, provide a lower perceived weight of the HMD 600, and improve user comfort while wearing the HMD 600.

Figure 7:
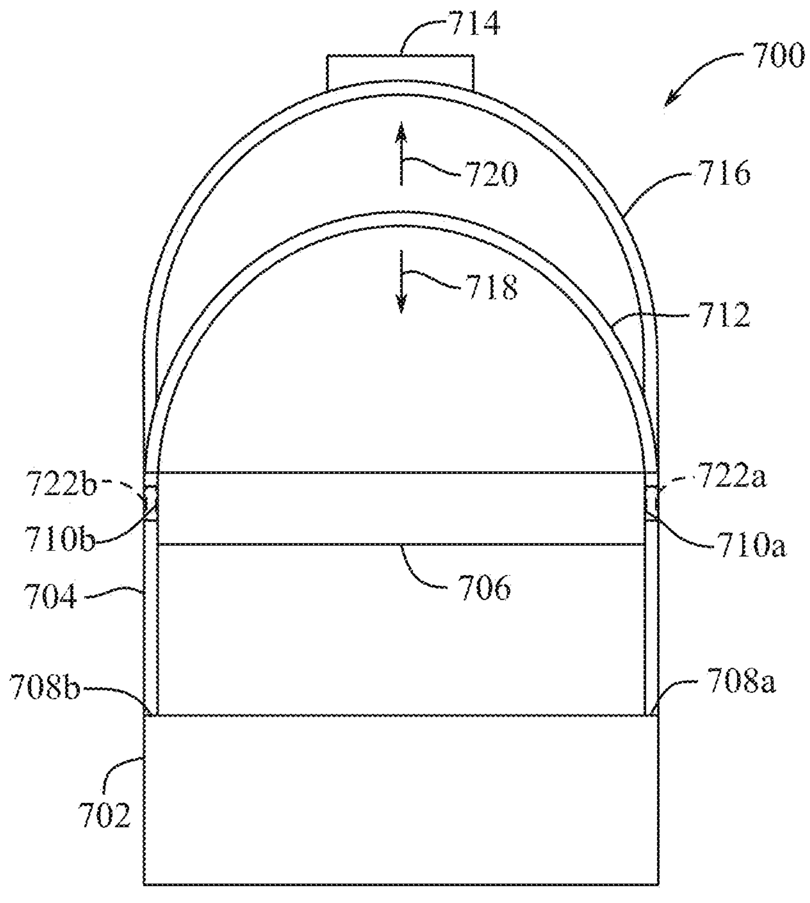
FIG. 7 shows a top-down view of a head-mountable device including overlapping bands with a counterbalance.

FIG. 7 illustrates an HMD 700 including two separate bands for independently adjusting tension of a securement band 704 on a user's head, and adjusting balance of the HMD 700 on the user's head. The HMD 700 can be the same as or similar to, including the same or similar components to, the HMDs 100, 300*a*, 300*b*, illustrated and discussed with respect to FIGS. 1 through 3B. For example, the HMD 700 can include a display unit 702, a securement band 704 extending from and connected to the display unit 702, and an overhead band 706 extending from and connected to the securement band 704. The securement band 704 can be connected to the display unit 702 at ends 708*a*, 708*b*, and the overhead band 706 can be connected to the securement band 704 at ends 710*a*, 710*b* (defining pivots 722*a*, 722*b*). The display unit 702 can include a display configured to present an augmented reality visualization, a virtual reality visualization, or another suitable visualization to the user. The securement band 704 can include electronic components that can be configured to operate and produce a virtual or augmented reality experience to the user through the HMD 700. The electronic components can include projectors, waveguides, speakers, processors, or memory components. In some examples, the securement band 704 and the overhead band 706, including the components connected thereto, can form a securement assembly.

The securement band 704 can include an adjustable band 712 configured to adjust tension of the securement band 704 relative to a user's head and a counterbalance band 716 configured to adjust balance of the securement band 704. The adjustable band 712 and the counterbalance band 716 can be portions of the securement band 704. The adjustable band 712 can include a tension adjustment system that adjusts tension in the adjustable band 712. For example, as illustrated in FIG. 7, the tension adjustment system can move the adjustable band 712 in a direction 718 to tighten the adjustable band 712 or can move the adjustable band 712 in a direction 720 to loosen the adjustable band 712. Tension in the tension adjustment system can be altered through an adjustment dial, a rack and pinion system, a gear-driven system, or the like, and can be automatically adjusted (through electric actuators or the like) or manually adjusted (through user manipulation or the like). The adjustable band 712 can include elastic portions that stretch and aid in donning and doffing the HMD 700. The adjustable band 712 can be included to provide adjustments in fit of the HMD 700 for a variety of user head sizes and shapes.

The counterbalance band 716 can include a counterbalance 714, and both the counterbalance band 716 and the counterbalance 714 can be configured to balance the moment arm of the display unit 702 about the pivots 722*a*, 722*b*. In some examples, the counterbalance 714 can be moveable with respect to the counterbalance band 716. For example, a position of the counterbalance 714 can be adjustable in directions proximal or distal relative to the display unit 702, or forward or rearward relative to a user's head. Moving the counterbalance 714 proximally or distally relative to the pivots 722*a*, 722*b* decreases or increases, respectively, the moment arm applied by the counterbalance 714, which can be used to balance the weight of the HMD 700 between the display unit 702 and the counterbalance 714. In some examples, the counterbalance 714 can move automatically, through a motor or other electronic actuator controlled by the HMD 700. In some examples, the counterbalance 714 can be manually actuated or adjusted. For example, a user of the HMD 700 can directly manipulate the counterbalance 714, or can manipulate a dial or another adjustment mechanism to adjust the position of the counterbalance 714.

In some examples, relative positions of the display unit 702, the pivots 722*a*, 722*b*, and the counterbalance 714 can remain fixed, while the adjustable band 712 is used to adjust tension applied through the securement band 704 to the user's head. The counterbalance band 716 can be provided with a length, and the counterbalance 714 can be provided with a mass to supply a moment arm about the pivots 722*a*, 722*b* that balances the display unit 702. Even as tension supplied from the adjustable band 712 is altered for users having different head sizes, the relative positions of the display unit 702, the pivots 722*a*, 722*b*, and the counterbalance 714 can remain fixed such that the balance of the HMD 700 is unchanged.

In some examples, the counterbalance band 716 can be formed of a relatively rigid material that maintains the position of the counterbalance 714. In some examples, the counterbalance band 716 can be formed of a flexible, elastic material, which can deform and return to its original shape. This can allow for the counterbalance band 716 and the counterbalance 714 to move to comfortable positions when the user rests their head against a surface (e.g., a headrest, pillow or the like), and return to the original position when the user removes their head from the surface.

Balancing the weight of the HMD 700 can move weight of the HMD 700 (e.g., the display unit 702) off of the user's face, shift weight bearing of the HMD 700 to the top of the user's head through the overhead band 706, provide a lower perceived weight of the HMD 700, and improve user comfort while wearing the HMD 700.

In some examples, one of the adjustable band 712 or the counterbalance band 716 can include the ends 708*a*, 708*b* attached to the display unit 702, and the other of the adjustable band 712 or the counterbalance band 716 can be attached to the one of the adjustable band 712 or the counterbalance band 716. The adjustable band 712 and the counterbalance band 716 can at least partially overlap. In some examples, each of the adjustable band 712 and the counterbalance band 716 can be attached to an additional portion of the securement band 704. In some examples, the adjustable band 712, the counterbalance band 716, and the overhead band 706 can be attached to the additional portion at the pivots 722*a*, 722*b*.

Figure 8A:
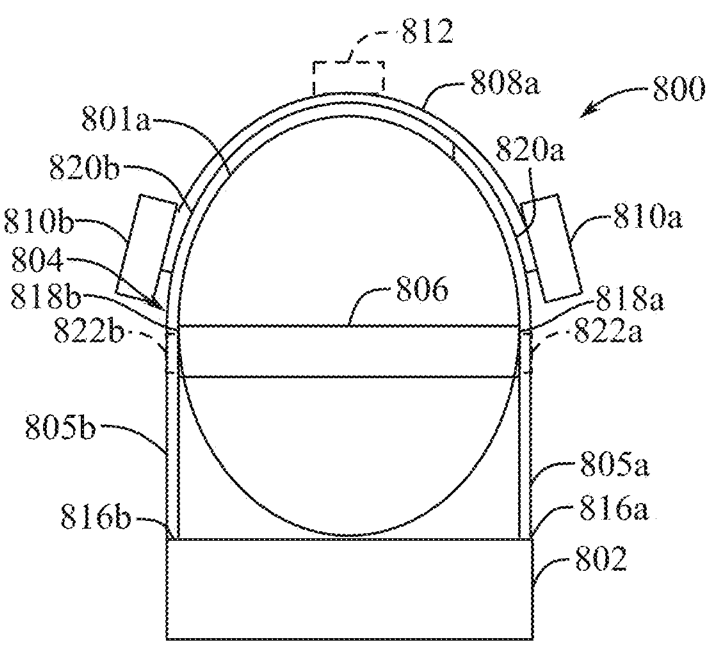
FIG. 8A shows a top-down view of a head-mountable device including adjustable bands with a counterbalance worn by a user.
Figure 8B:
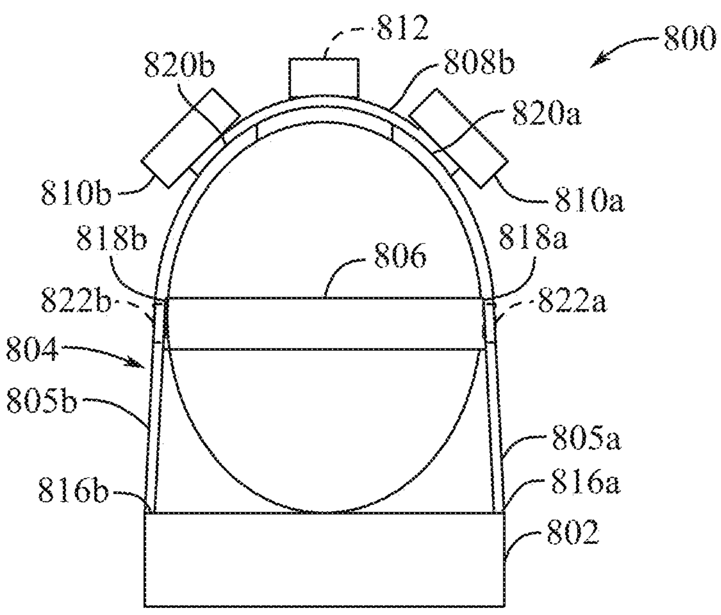
FIG. 8B shows a top-down view of a head-mountable device including adjustable bands with a counterbalance worn by a user.

FIGS. 8A and 8B illustrate an HMD 800 that is donned by users having different head sizes. More specifically, FIG. 8A illustrates the HMD 800 being donned by a user 801*a* having a relatively large head, and FIG. 8B illustrates the HMD 800 being donned by a user 801*b* having a relatively small head. The HMD 800 can be the same as or similar to, including the same or similar components to, the HMDs 100, 300*a*, 300*b*, illustrated and discussed with respect to FIGS. 1 through 3B. For example, the HMD 800 can include a display unit 802, a securement band 804 extending from and connected to the display unit 802, and an overhead band 806 extending from and connected to the securement band 804. The securement band 804 can be connected to the display unit 802 at ends 816*a*, 816*b*, and the overhead band 806 can be connected to the securement band 804 at ends 818*a*, 818*b* (defining pivots 822*a*, 822*b*). The display unit 802 can include a display configured to present an augmented reality visualization, a virtual reality visualization, or another suitable visualization to the user. The securement band 804 can include electronic components that can be configured to operate and produce a virtual or augmented reality experience to the user through the HMD 800. The electronic components can include projectors, waveguides, speakers, processors, or memory components.

The securement band 804 can include proximal portions 805*a*, 805*b* attached to the display unit 802 by the ends 816*a*, 816*b*, receptively, and respective distal portions 808*a*, 808*b* connecting the proximal portions 805*a*, 805*b* to one another. The distal portions 808*a*, 808*b* can overlap the proximal portions 805*a*, 805*b*, or ends of the distal portions 808*a*, 808*b* and the proximal portions 805*a*, 805*b* can be attached to one another. The distal portions 808*a*, 808*b* can be connected to the proximal portions 805*a*, 805*b* at connection points 820*a*, 820*b*. Counterbalances 810*a*, 810*b* can be attached to the distal portions 808*a*, 808*b*. In FIGS. 8A and 8B, the counterbalances 810*a*, 810*b* are illustrated as being attached to the distal portions 808*a*, 808*b* at points overlapping the proximal portions 805*a*, 805*b*, however, the counterbalances 810*a*, 810*b* can be attached anywhere along the length of the distal portions 808*a*, 808*b*. The counterbalances 810*a*, 810*b* can include any of the previously-described counterbalances, such as functional components (e.g., electronic components), non-functional components, or the like. In some examples, the distal portions 808*a*, 808*b* can include weighted band portions, cables, or the like, and additional counterbalances 810*a*, 810*b* can be omitted.

An adjustment mechanism 812 can be included in the distal portions 808*a*, 808*b*. The adjustment mechanism 812 can be configured to adjust both the tension of the securement band 804 and the balance of the HMD 800. For example, FIG. 8A illustrates an example in which the adjustment mechanism 812 is used to loosen the securement band 804 (lengthening the distal portion 808*a*) such that the HMD 800 can be worn on a relatively large user's head 801*a*. FIG. 8B illustrates an example in which the adjustment mechanism 812 is used to tighten the securement band 804 (shortening the distal portion 808*b*) such that the HMD 800 can be worn on a relatively small user's head 801*b*. The adjustment mechanism 812 can include an adjustment dial, a rack and pinion system, a gear-driven system, or the like, and can be automatically adjusted (through electric actuators or the like) or manually adjusted (through user manipulation or the like).

By lengthening the distal portion 808*a* to the configuration of FIG. 8A, or shortening the distal portion 808*b* to the configuration of FIG. 8B, the adjustment mechanism 812 can be used to alter the balance of the HMD 800. For example, when the distal portion 808*a* is lengthened, the counterbalances 810*a*, 810*b* can move forward relative to the user's head 801*a*. When the distal portion 808*b* is shortened, the counterbalances 810*a*, 810*b* can move rearward relative to the user's head 801*b*.

In some examples, relative positions of the counterbalances 810*a*, 810*b*, the display unit 802, and the pivots 822*a*, 822*b* can remain fixed in a direction perpendicular to a longitudinal axis of the display unit 802 while the adjustment mechanism 812 is used to adjust the size of the securement band 804 for different user's heads 801*a*, 801*b*. For example, when the distal portion 808*a* is lengthened, the counterbalances 810*a*, 810*b* can move forward relative to the user's head 801*a*, but can remain in fixed positions relative to the display unit 802 in a direction perpendicular to the longitudinal axis of the display unit 802 such that the HMD 800 remains balanced. When the distal portion 808*b* is shortened, the counterbalances 810*a*, 810*b* can move rearward relative to the user's head 801*b*, but can remain in fixed positions relative to the display unit 802 in a direction perpendicular to the longitudinal axis of the display unit 802 such that the HMD 800 remains balanced.

The counterbalances 810*a*, 810*b* can be positioned relative to the distal portions 800*a*, 800*b* and the mass of the counterbalances 810*a*, 810*b* can be provided to balance the moment arm of the display unit 802 about the pivots 822*a*, 822*b*, even while head sizes of users is variable. Balancing the weight of the HMD 800 can move weight of the HMD 800 (e.g., the display unit 802) off of the user's face, shift weight bearing of the HMD 800 to the top of the user's head through the overhead band 806, provide a lower perceived weight of the HMD 800, and improve user comfort while wearing the HMD 800.

Figure 9:
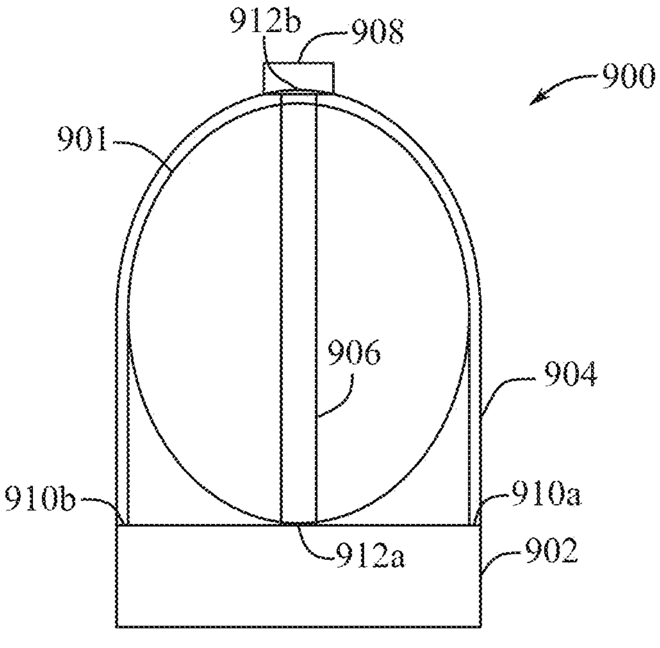
FIG. 9 shows a top-down view of a head-mountable device including a counterbalance worn by a user.

FIG. 9 illustrates an HMD 900 including an overhead band 906 that extends in a direction perpendicular to a longitudinal axis of a display unit 902. The HMD 900 can be the same as or similar to, including the same or similar components to, the HMDs 100, 300*a*, 300*b*, illustrated and discussed with respect to FIGS. 1 through 3B. For example, the HMD 900 can include the display unit 902 and a securement band 904 extending from and connected to the display unit 902. The overhead band 906 can extend from and be connected to the display unit 902 and the securement band 904. The securement band 904 can be connected to the display unit 902 at ends 910*a*, 910*b*. The overhead band 906 can be connected to the display unit 902 and the securement band 904 at ends 912*a*, 912*b*, respectively. The display unit 902 can include a display configured to present an augmented reality visualization, a virtual reality visualization, or another suitable visualization to the user. The securement band 904 can include electronic components that can be configured to operate and produce a virtual or augmented reality experience to the user through the HMD 900. The electronic components can include projectors, waveguides, speakers, processors, or memory components.

A counterbalance 908 can be connected to the overhead band 906. The counterbalance 908 can move proximally or distally relative to the display unit 902 or forward or rearward relative to a user wearing the HMD 900 along the overhead band 906 to balance the HMD 900. Moving the counterbalance 908 proximally or distally relative to the display unit 902 decreases or increases, respectively, the moment arm applied by the counterbalance 908, which can be used to balance the weight of the HMD 900 between the display unit 902 and the counterbalance 908.

In some examples, the counterbalance 908 can move automatically, through a motor or other electronic actuator controlled by the HMD 900. In some examples, a user's face can be scanned, a head size of the user can be estimated, and the counterbalance 908 can be automatically adjusted based on this face scan and estimated head size. In some examples, the counterbalance 908 can be manually actuated or adjusted. For example, a user of the HMD 900 can directly manipulate the counterbalance 908, or can manipulate a dial or another adjustment mechanism to adjust the position of the counterbalance 908. In some examples, the overhead band 906 that extends perpendicular to the longitudinal axis of the display unit 902 can be provided to allow the HMD 900 to be worn by a broad range of users that cannot be accommodated by an HMD having an overhead band that extends parallel to a longitudinal axis of a display unit. For example, the overhead band 906 can be comfortably worn by user's that also wear turbans or the like. Balancing the weight of the HMD 900 can move weight of the HMD 900 (e.g., the display unit 902) off of the user's face, shift weight bearing of the HMD 900 to the top of the user's head through the overhead band 906, provide a lower perceived weight of the HMD 900, and improve user comfort while wearing the HMD 900.

Figure 10:
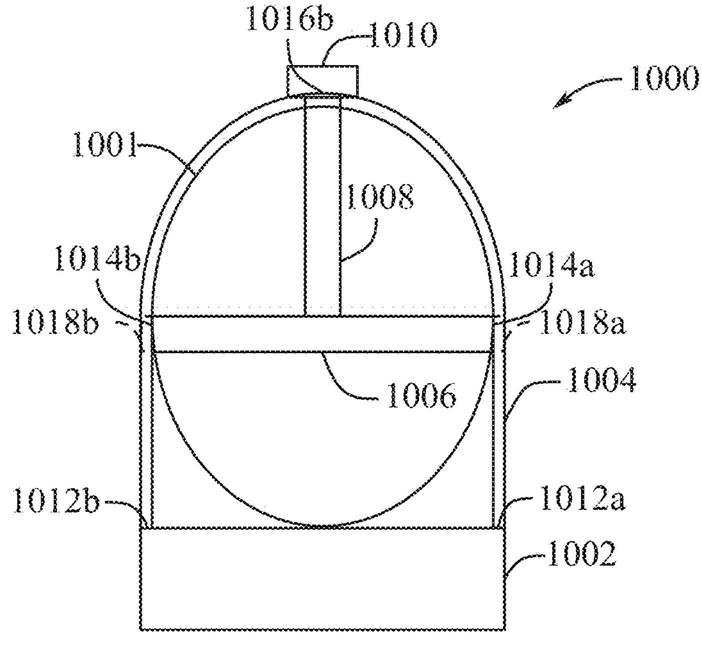
FIG. 10 shows a top-down view of a head-mountable device including a counterbalance worn by a user.

FIG. 10 illustrates an HMD 1000 including an overhead band 1006 that extends in a direction parallel to a longitudinal axis of a display unit 1002 and an overhead band 1008 that extends in a direction perpendicular to the longitudinal axis of a display unit 1002. The HMD 1000 can be the same as or similar to, including the same or similar components to, the HMDs 100, 300*a*, 300*b*, illustrated and discussed with respect to FIGS. 1 through 3B. For example, the HMD 1000 can include the display unit 1002 and a securement band 1004 extending from and connected to the display unit 1002. The overhead band 1008 can extend from and be connected to the overhead band 1006 and the securement band 1004. The securement band 1004 can be connected to the display unit 1002 at ends 1012*a*, 1012*b*. The overhead band 1006 can be connected to the securement band 1004 at ends 1014*a*, 1014*b* (defining pivots 1018*a*, 1018*b*). The overhead band 1008 can be connected to the overhead band 1006 and the securement band 1004 at ends 1016*a*, 1016*b*, respectively. The display unit 1002 can include a display configured to present an augmented reality visualization, a virtual reality visualization, or another suitable visualization to the user. The securement band 1004 can include electronic components that can be configured to operate and produce a virtual or augmented reality experience to the user through the HMD 1000. The electronic components can include projectors, waveguides, speakers, processors, or memory components.

A counterbalance 1010 can be connected to the overhead band 1008. The counterbalance 1010 can move proximally or distally relative to the display unit 1002 or forward or rearward relative to a user wearing the HMD 1000 along the overhead band 1008 to balance the HMD 1000. Moving the counterbalance 1010 proximally or distally relative to the display unit 1002 decreases or increases, respectively, the moment arm applied by the counterbalance 1010, which can be used to balance the weight of the HMD 1000 between the display unit 1002 and the counterbalance 1010.

In some examples, the counterbalance 1010 can move automatically, through a motor or other electronic actuator controlled by the HMD 1000. In some examples, a user's face can be scanned, a head size of the user can be estimated, and the counterbalance 1010 can be automatically adjusted based on this face scan and estimated head size. In some examples, the counterbalance 1010 can be manually actuated or adjusted. For example, a user of the HMD 1000 can directly manipulate the counterbalance 1010, or can manipulate a dial or another adjustment mechanism to adjust the position of the counterbalance 1010. Both the overhead band 1006 and the overhead band 1008 can be included to add stability to the HMD 1000. Moreover, a single counterbalance 1010 can be provided to alter the balance of the HMD 1000, rather than two counterbalances being used to balance each side of an HMD. Balancing the weight of the HMD 1000 can move weight of the HMD 1000 (e.g., the display unit 1002) off of the user's face, shift weight bearing of the HMD 1000 to the top of the user's head through the overhead band 1006 and the overhead band 1008, provide a lower perceived weight of the HMD 1000, and improve user comfort while wearing the HMD 1000.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A head-mountable electronic device, comprising:
- a display unit;
- a first securement band connected to the display unit;
- a second securement band connected to the first securement band;
- an overhead band including a first end secured to the first securement band and a second end secured to the first securement band;
- a counterbalance connected to the second securement band between the first end and the second end; and
- an adjustment mechanism, wherein:
- the counterbalance is adjustably connected to the first securement band via the adjustment mechanism; and
- the adjustment mechanism is configured to modify a distance between the counterbalance and the first securement band.

2. The head-mountable electronic device of claim 1, wherein:
- the counterbalance is a first counterbalance; and
- the head-mountable electronic device further comprises a second counterbalance connected to the first securement band between the first counterbalance and the second end.

3. The head-mountable electronic device of claim 2, wherein
- a second distance between the second counterbalance and the second end is adjustable.

4. The head-mountable electronic device of claim 1, wherein the counterbalance comprises an electronic component of the head-mountable electronic device.

5. The head-mountable electronic device of claim 4, wherein the electronic component comprises a battery electrically coupled to the display unit.

6. The head-mountable electronic device of claim 1, wherein:
- the first securement band comprises:
  - a first portion including opposing ends coupled to the display unit; and
  - a second portion overlapping the first portion between the first end and the second end, the second portion adjustable relative to the first portion; and
- the counterbalance is connected to one of:
  - the first portion between the first end and the second end, or
  - the second portion.

7. The head-mountable electronic device of claim 6, wherein:
- a length of the first portion is adjustable; and
- a length of the second portion is adjustable.

8. The head-mountable electronic device of claim 1, wherein the counterbalance is slidably connected to the first securement band.

9. The head-mountable electronic device of claim 8, wherein the adjustment mechanism comprises a piston, wherein the counterbalance is adjustably connected to the first securement band via the piston.

10. A wearable electronic device, comprising:
- a display unit; and
- a securement assembly, comprising:
  - a first band having a first end secured to the display unit and a second end secured to the display unit;
  - a second band connected to the first band at a first pivot between the first end and the second end and at a second pivot between the first pivot and the second end;
  - a first counterbalance adjustably secured to the first band between the first pivot and the second pivot;
  - a second counterbalance adjustably secured to the first band between the first pivot and the second pivot; and
  - an actuator configured to adjust a first distance between the first counterbalance and the first pivot;

wherein:
- the display unit is disposed opposite at least one of the first pivot or the second pivot from at least one of the first counterbalance or the second counterbalance.

11. The wearable electronic device of claim 10, wherein:
- the display unit comprises a display screen; and
- the first counterbalance comprises a battery electrically coupled to the display screen.

12. The wearable electronic device of claim 10, wherein: the actuator is further configured to adjust a second distance between the second counterbalance and the second pivot.

13. The wearable electronic device of claim 12, further comprising a controller electrically coupled to the actuator and configured to cause the actuator to adjust the first distance and the second distance based on a change in a length of the first band.

14. The wearable electronic device of claim 10, wherein the first counterbalance and the second counterbalance are manually adjustable.

15. A head-mountable display device, comprising:
a display unit;
a counterbalance;
a securement band extending between the display unit and the counterbalance;
an overhead band coupled to the securement band to define a pivot between the display unit and the counterbalance; and
an adjustment mechanism disposed between the counterbalance and the pivot,
wherein:
a first moment arm is defined between the pivot and the display unit;
a second moment arm is defined between the pivot and the counterbalance; and
the adjustment mechanism is configured to adjust the second moment arm.

16. The head-mountable display device of claim 15, wherein:
the counterbalance is adjustably connected to the securement band; and
the counterbalance is adjustable to equalize the first moment arm and the second moment arm.

17. The head-mountable display device of claim 16, further comprising:
an actuator mechanically coupled to the counterbalance; and
a controller electrically coupled to the actuator and configured to cause the actuator to adjust a position of the counterbalance to equalize the first moment arm and the second moment arm.

18. The head-mountable display device of claim 17, wherein the adjustment of the position of the counterbalance is based on a change in a length of the securement band.

19. The head-mountable display device of claim 15, further comprising an adjustment mechanism configured to adjust a length of the securement band.

20. The head-mountable display device of claim 19, wherein the second moment arm is adjustable independent from an adjustment of the length of the securement band.

* * * * *